United States Patent [19]

Shiobara et al.

[11] Patent Number: 5,225,484
[45] Date of Patent: Jul. 6, 1993

[54] EPOXY RESIN COMPOSITIONS AND CURED PRODUCTS THEREOF

[75] Inventors: Toshio Shiobara; Takayuki Aoki, both of Annaka; Kazutoshi Tomiyoshi; Takashi Tsuchiya, both of Takasaki, all of Japan

[73] Assignee: Shin-Etsu Chemical Co., Ltd, Tokyo, Japan

[21] Appl. No.: 798,750

[22] Filed: Nov. 27, 1991

[30] Foreign Application Priority Data

Nov. 30, 1990 [JP] Japan .................................. 2-339911

[51] Int. Cl.$^5$ .......................... C08F 8/00; C08L 83/00
[52] U.S. Cl. ..................................... 525/101; 525/102; 525/476; 525/478; 525/479
[58] Field of Search ............... 525/101, 476, 478, 479, 525/102

[56] References Cited

U.S. PATENT DOCUMENTS

| | | | |
|---|---|---|---|
| 4,138,387 | 2/1979 | Bleustein | 524/493 |
| 4,550,056 | 10/1985 | Pickwell et al. | 428/391 |
| 4,826,638 | 5/1989 | Hopperdietzel | 525/101 |
| 4,859,722 | 8/1989 | Shiobara et al. | 525/476 |
| 4,861,833 | 8/1989 | Chasser et al. | 525/122 |
| 4,985,483 | 1/1991 | Saito et al. | 525/479 |
| 5,006,581 | 4/1991 | Nakane et al. | 525/476 |
| 5,028,653 | 7/1991 | Desmonceau et al. | 524/745 |
| 5,043,211 | 8/1991 | Yoshizumi et al. | 523/209 |
| 5,053,450 | 10/1991 | Coran | 524/506 |
| 5,100,958 | 3/1992 | Fuhr et al. | 525/101 |

FOREIGN PATENT DOCUMENTS 0285450 10/1988 European Pat. Off. .

OTHER PUBLICATIONS

Patent Abstracts of Japan, vol. 13, No. 174 (C-589) 25 Apr. 1989 (Shin Etsu Chem. Co. Ltd.) 9 Jan. 1989 & JP-A-1 004 614; Derwent abs. 89-049406.
World Patents Index Latest, Week 1290, Derwent Pub. Ltd., London, GB; AN 90-088465 & JP-A-2 043 279 (Shinetsu Chem. Ind. KK).
World Patents Index Latest, Week 0388, Dersent Pub. Ltd., London, GB; AN 88-017925 & JP-A-62 280 215 (Shinetsu Chem. Ind. KK).

Primary Examiner—Melvyn I. Marquis
Assistant Examiner—Randy Gulakowski
Attorney, Agent, or Firm—Birch, Stewart, Kolasch & Birch

[57] ABSTRACT

A composition comprising an epoxy resin and a curing agent is blended with a thermoplastic resin impregnated with an organic silicon compound to provide an epoxy resin composition which cures into products having improved adhesion and thermal impact and is suitable for encapsulating semiconductor devices.

The impregnated thermoplastic resin is formed by swelling the thermoplastic resin with a solvent and impregnating the swollen thermoplastic resin with the organic silicon compound.

11 Claims, No Drawings

EPOXY RESIN COMPOSITIONS AND CURED PRODUCTS THEREOF

This invention relates to epoxy resin compositions which cure into products having improved adhesion and thermal impact.

BACKGROUND OF THE INVENTION

The recent development of thin semiconductor packages has been accompanied by several problems. For example, in mounting flat packages on printed circuit boards, the packages are dipped in a hot solder bath, which often causes the packages to be cracked by thermal impact if the semiconductors are encapsulated with conventional epoxy resin compositions. It is also recently reported that if semiconductor packages contain moisture prior to mounting on printed circuit boards, hot solder bath dipping can induce steam explosion within the packages, also resulting in cracks.

Attempts for overcoming the crack problem have been made from both the aspects of frame and encapsulating resin, but none of them are successful.

SUMMARY OF THE INVENTION

Therefore, an object of the present invention is to provide an epoxy resin composition which can cure into products having improved adhesion and thermal impact. Another object is to provide such cured products.

The inventors have found that by blending an epoxy resin composition comprising an epoxy resin and a curing agent therefor with a thermoplastic resin impregnated with an organic silicon compound, there is obtained an epoxy resin composition which cures into products having improved adhesion and thermal impact resistance and is thus suited as encapsulants for semiconductor devices. Better results are obtained by blending an epoxy-silicone resin copolymer along with the thermoplastic resin impregnated with an organic silicon compound.

Accordingly, the present invention provides an epoxy resin composition comprising an epoxy resin, a curing agent therefor, and a thermoplastic resin impregnated with an organic silicon compound. Cured products of the composition are also contemplated.

DETAILED DESCRIPTION OF THE INVENTION

A first essential component used in the composition of the invention is an epoxy resin having at least two epoxy groups in a molecule. Examples of the epoxy resin include bisphenol type epoxy resins, novolak type epoxy resins such as phenol novolak and cresol novolak epoxy resins, triphenol alkane type epoxy resins, and naphthalene ring-containing epoxy resins.

Illustrative, non-limiting examples of the epoxy resin are given below.

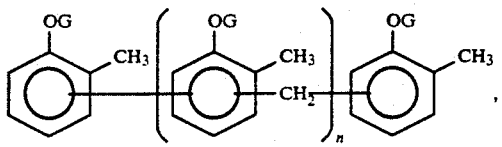

-continued

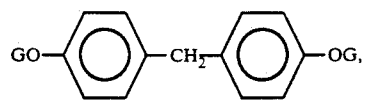

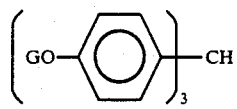

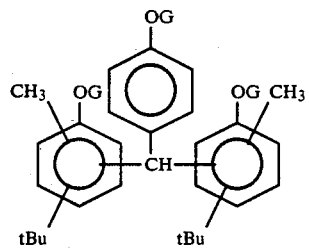

In the formulae, G is

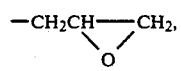

tBu is -C(CH$_3$)$_3$, and n is an integer of from 0 to 30.

These epoxy resins may be used alone or in admixture of two or more. Preferred epoxy resins have a softening point of 50° to 100° C. and an epoxy equivalent of 100 to 400. Brominated epoxy resins are useful particularly when flame retardancy is required.

A second essential component is a curing agent. Preferred curing agents are phenolic resins having more than one phenolic hydroxyl group, typically phenol novolak resins, cresol novolak resins, and triphenol methane. Preferred phenolic resins have a softening point of 60° to 120° C. and a hydroxyl equivalent of 90 to 150.

The second component or curing agent is blended in commonly used amounts, for example, about 20 to 100 parts, preferably about 30 to about 60 parts by weight per 100 parts by weight of the epoxy resin.

A third essential component is a thermoplastic resin impregnated with an organic silicon compound. When the third component is blended with an epoxy resin composition according to the present invention, the thermoplastic resin is present in the matrix as microphase separated particles of 5 microns or less while the organic silicon compound forms a firm bond with the epoxy resin at the interface of the particles. As a result, there is obtained an epoxy resin composition capable of forming cured products having improved thermal impact.

Examples of the thermoplastic elastomer used herein include styrene-butadiene-methyl methacrylate copolymers (MBS resins), styrene-ethylene-butene-styrene copolymers (SEBS resins), polybutadiene rubber, polyisoprene rubber, styrene-butadiene-vinyl pyridine copolymers, acrylonitrile-butadiene-styrene copolymers (ABS resins), acrylonitrile-styrene copolymers (AS resins), styrene-isoprene copolymers, vinylidene fluoride resin, carboxy-modified butadiene-acrylonitrile copolymers, thermoplastic resin nylon, polybutylene terephthalate resin, polybutene-1, polyvinyl hexylal resin, polyvinyl propional resin, polyvinyl acetoacetal resin, polyvinyl butyral resin, polyvinyl formal resin, polyvinyl ether resin, polyester elastomers, polyurethane-methyl methacrylate copolymers, etc., with the styrene-butadiene-methyl methacrylate copolymers (MBS resins) being most preferred.

The organic silicon compounds used herein are organic silicon compounds of formula (1) which are reactive with an epoxy group.

$$R^1R^2_a Si(OR^3)_{3-a} \quad (1)$$

In formula (1), $R^1$ is an organic group with 1 to 10 carbon atoms having a functional group such as an alkenyl (e.g., vinyl and allyl), acryl, methacryl, amino, ethylenediamino, amido, and ureido group, $R^2$ is a hydrogen atom or a substituted or unsubstituted monovalent hydrocarbon group having 1 to 5 carbon atoms, $R^3$ is a substituted or unsubstituted monovalent hydrocarbon group having 1 to 5 carbon atoms or an alkoxy group, and letter a is $0 \leq a \leq 2$.

Examples of the group represented by $R^1$ include vinyl, allyl, γ-acryloxypropyl, γ-methacryloxypropyl, γ-aminopropyl, N-β-(aminoethyl)-γ-aminopropyl, N-phenyl-γ-aminopropyl, and $H_2NCONHC_3H_6$-groups. Examples of the group represented by $R^2$ include a hydrogen atom and, methyl, ethyl, propyl, butyl and pentyl groups. Examples of the group represented by $R^3$ include methyl, ethyl, propyl, butyl, pentyl, methoxyethyl, ethoxyethyl, methoxymethyl, and ethoxymethyl groups.

Illustrative, non-limiting examples of the organic silicon compound include compounds of the following structural formulae.

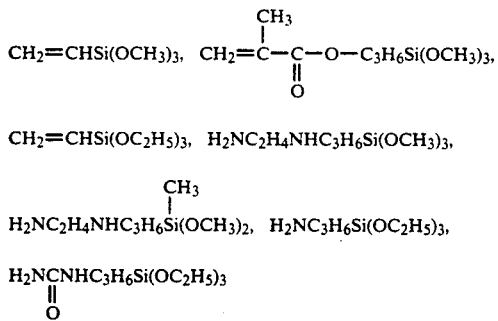

The organic silicon compounds are preferably used in amounts of about 0.5 to about 10 parts, more preferably about 1 to about 5 parts by weight per 100 parts by weight of the thermoplastic resin. No substantial improvement in adhesion would be achieved with less than 0.5 parts by weight whereas the entire composition would lose impact resistance with more than 10 parts by weight of the organic silicon compound on this basis.

The thermoplastic resin is impregnated with the organic silicon compound by various methods, preferably by swelling the thermoplastic resin with a suitable solvent prior to impregnation with the organic silicon compound. The solvent used herein is one in which the thermoplastic resin is not soluble, but with which the thermoplastic resin is swollen, for example, toluene, xylene, benzene, hexane, cyclohexane, tetrahydrofuran, methyl isobutyl ketone, acetone, cyclohexanone, methanol, ethanol, and butanol. The solvents may be used alone or in admixture of two or more. The solvent is used in amounts of at least about 500 parts, preferably at least about 700 parts by weight per 100 parts by weight of the thermoplastic resin. With less than 500 parts of the solvent, the resin would sometimes swell to a less satisfactory extent.

The thermoplastic resin swollen with solvent is then impregnated with the organic silicon compound by mixing them at 20° to 80° C. for about 4 to about 24 hours while introducing nitrogen.

It is essential that the thermoplastic resin be impregnated with the organic silicon compound because a mere mixture of the thermoplastic resin and the organic silicon compound cannot achieve the objects of the present invention.

The epoxy resin composition of the invention may be prepared by pre-blending the third component with one or more base resins selected from the group consisting of an epoxy resin, a phenolic resin, and an epoxy-silicone resin copolymer so that the third component is uniformly dispersed in the base resin.

The third component is preferably blended in amounts of about 1 to about 15 parts, more preferably about 2 to about parts by weight per 100 parts by weight of the epoxy resin plus curing agent. Adhesion improvement is less desirable with less than about 1 part whereas mechanical strength would lower with more than 15 parts of the third component on this basis.

Preferably, an epoxy-silicone resin copolymer is used as a fourth component along with the third component because the benefits of the invention are enhanced. The epoxy-silicone resin copolymers used herein are preferably reaction products obtained by addition reaction between an alkenyl group-containing epoxy resin and an organopolysiloxane of the following formula (2):

$$H_aR_bSiO_{(4-a-b)/2} \quad (2)$$

wherein R is a substituted or unsubstituted monovalent hydrocarbon group, a is a number of from 0.01 to 0.1, b is a number of from 1.8 to 2.2, and $1.8 < a+b < 2.3$, the number of silicon atoms per molecule is an integer of from 20 to 500, and the number of hydrogen atoms directly attached to silicon atoms is an integer of from 1 to 5.

The alkenyl group-containing epoxy resin may be obtained, for example, by epoxidizing an alkenyl group-containing phenolic resin with epichlorohydrin, or by partially reacting a conventional well-known epoxy resin with 2-allylphenol, etc. Preferred alkenyl group-containing epoxy resins are alkenyl group-containing epoxy resins having an aromatic ring, especially epoxidized phenol and cresol novolak resins containing an alkenyl group. Illustrative examples of the alkenyl group-containing epoxy resin are those of formulae (3) to (5).

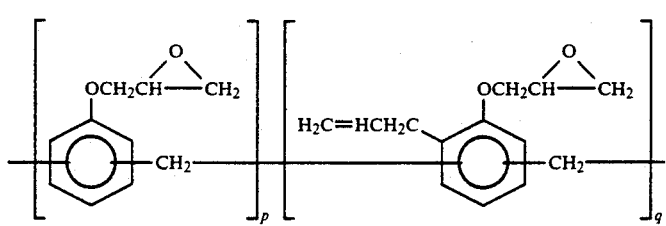

(3)

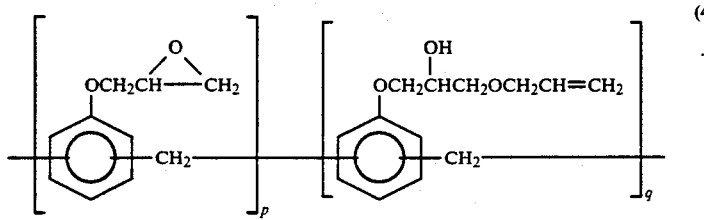

(4)

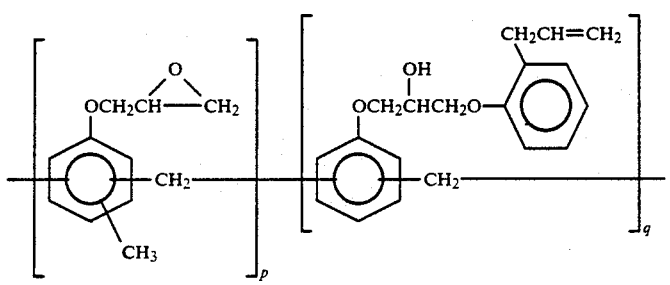

(5)

In the above formulae, p and q are generally positive numbers in the range of $1 < p < 10$ and $1 < q < 3$.

No particular limit is imposed on the organopolysiloxane of formula (2) as long as it has at least one ≡SiH group in a molecule. Examples of the substituted or unsubstituted monovalent hydrocarbon group represented by R include alkyl groups such as methyl and ethyl groups, aryl groups such as phenyl group, haloalkyl groups, and cycloalkyl groups. Preferred polysiloxanes are both hydrogen-terminated methylpolysiloxane, both hydrogen-terminated methylphenylpolysiloxane, and both hydrogen-terminated methyl(2-trimethoxysilylethyl)polysiloxane.

Illustrative, non-limiting examples of the organopolysiloxane of formula (2) are compounds of formulae (6) to (10).

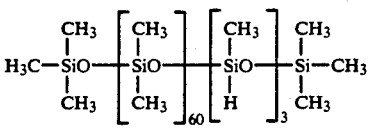

(6)

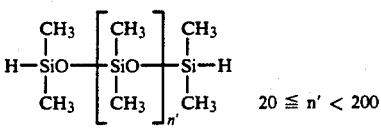

$20 \leqq n' < 200$ (7)

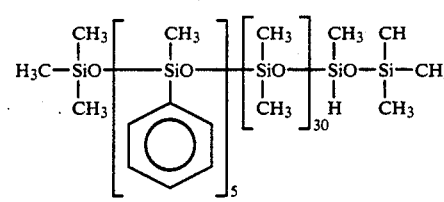

(8)

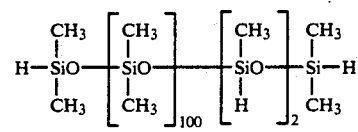

(9)

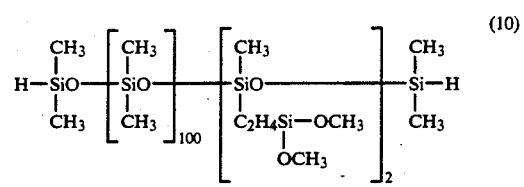

(10)

The organopolysiloxanes of formula (2) preferably have a degree of polymerization of from 20 to 500, more preferably from 30 to 300. With organopolysiloxanes having a degree of polymerization of less than 20, the resulting composition would sometimes become less flexible and low in glass transition temperature. It is technically very difficult to synthesize organopolysiloxanes having a degree of polymerization of more than 500, and if possible, copolymers of such organopolysiloxanes are difficult to disperse in the epoxy resin composition, failing to achieve the objects of the invention. In general, organopolysiloxanes having a fixed silicone content tend to increase crack resistance and glass transition temperature, but lower dispersibility and adhesion to elements as the degree of polymerization increases. Dispersibility and adhesion to elements can be improved by introducing a modifying group as given below into side chains as represented by formula (10).

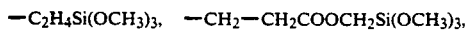

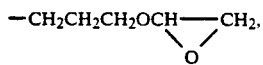

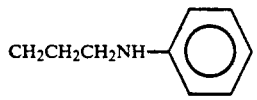

The epoxy-silicone resin copolymer which is to be blended in the epoxy resin composition of the invention as the fourth component may be obtained by reacting an alkenyl group-containing epoxy resin with an organopolysiloxane of formula (2), both as defined above, at elevated temperatures in the presence of a well-known addition catalyst, for example, platinum catalyst, typically chloroplatinic acid. The attainment of an epoxy resin composition having a high glass transition temperature, a low coefficient of expansion and high crack resistance is largely due to the fact that the epoxy-silicone resin copolymer is immiscible with the (curable) epoxy resin, but assumes a sea-island structure in the epoxy resin composition. Therefore, the copolymer desirably has a solubility parameter of 7.3 to 8.5, especially 7.6 to 8.2. A copolymer having a solubility parameter within this range can be obtained by reacting an organopolysiloxane with an alkenyl group-containing epoxy resin under a condition: $0.7 < X/Y < 7$ wherein X is the $\equiv$SiH equivalent of the organopolysiloxane and Y is the molecular weight of the alkenyl group-containing epoxy resin.

The epoxy-silicone resin copolymer is blended in amounts of 0 to about 50 parts, preferably from about 5 to about 50 parts, more preferably from about 5 to about 40 parts by weight per 100 parts by weight of the epoxy resin plus curing agent. More than 50 parts of the copolymer can sometimes be detrimental to adhesion improvement.

Inorganic fillers may be blended in the composition of the present invention for the purpose of reducing the coefficient of expansion of the composition as an encapsulant, thereby reducing stresses applied to semiconductor elements. Fused silica and crystalline silica in ground or spherical form are often used as the filler although alumina, silicon nitride, aluminum nitride and the like are acceptable. A blend of spherical and ground silicas or spherical silica alone is preferably used to ensure both the flow of the composition and the low expansion of cured products.

Preferably the inorganic fillers have a mean particle size of about 5 to about 20 microns. It is desirable that the inorganic fillers be treated on the surface with silane coupling agents prior to use.

The inorganic fillers are preferably used in amounts of from about 200 to about 1600 parts, especially from 400 to about 1000 parts by weight per 100 parts by weight of the epoxy resin. Some epoxy resin compositions containing less than 200 parts of the filler would have a higher coefficient of expansion so that larger stresses can be applied to semiconductor elements, resulting in a loss of element performance. Epoxy resin compositions containing more than 1600 parts of the filler are undesirably viscous during molding.

Curing catalysts may be blended in the epoxy resin compositions of the invention. Exemplary curing catalysts include imidazole and its derivatives, phosphine derivatives, and cycloamidine derivatives. The curing catalysts are blended in amounts of about 0.001 to about 5 parts, preferably about 0.1 to about 2 parts by weight per 100 parts by weight of the epoxy resin. Less than 0.001 part of the curing catalyst would fail to complete curing within a short time whereas more than 5 parts would give a too high curing rate to provide satisfactory molded products.

It is further recommended that silicone base flexibilizers other than the above-mentioned epoxy-silicone resin copolymer be added to the epoxy resin composition of the invention, and that the inorganic fillers on the surface are treated with two part type silicone rubber or silicone gel. The silicone base flexibilizers used herein include silicone rubber powder, silicone gel, and block polymers of phenol resin and silicone polymer. Such stress reducing agents are preferably added in amounts of about 0.5 to about 10%, more preferably about 1 to about 5% by weight based on the entire weight of the epoxy resin composition. Less than 0.5% would not be effective for improving impact resistance whereas more than 5% of the stress reducing agent would adversely affect mechanical strength.

In addition to the above-mentioned components, the epoxy resin composition of the invention may contain any other additives if desired or necessary. Examples of such additives include mold release agents such as carnauba wax, higher fatty acids, and synthetic wax, silane coupling agents, antimony oxide, and phosphorus compounds.

The epoxy resin composition of the present invention may be prepared by evenly mixing predetermined amounts of selected components, milling the mixture in a kneader, roll mill, or extruder preheated at 70° to 95° C., cooling the mixture, and comminuting into pellets. The order of blending the components is not critical.

The epoxy resin composition of the invention is utilized in encapsulating semiconductor elements including IC, LSI, transistors, thyristors, and diodes as well as in the manufacture of printed circuit boards. Semiconductor devices may be encapsulated with the composition of the invention by conventional molding techniques such as transfer molding, injection molding, and casting. The composition may be molded at a temperature of about 150° to about 180° C. and post cured at about 150° to about 180° C. for about 2 to about 16 hours.

There has been described an epoxy resin composition which cures into products having improved adhesion and thermal shock resistance and is thus suited as an encapsulant for semiconductor devices.

EXAMPLE

Examples of the present invention are given below by way of illustration and not by way of limitation. All parts are by weight.

Before entering Examples, it is first described how to synthesize resins or resin mixes (1) to (8) used in Examples.

SYNTHESIS 1

A 5-liter flask equipped with a reflux condenser, thermometer, and nitrogen inlet tube was charged with 3 liters of toluene and 300 grams of KaneAce M-910 (styrene-butadiene-methyl methacrylate copolymer, manufactured by Kanegafuchi Chemical K. K.). To the flask was added 3 grams of N-β-(aminoethyl)-γ-aminopropyltrimethoxysilane (manufactured by Shin-Etsu Chemical Co., Ltd. . Then the contents were mixed for one hour at 40° C. in nitrogen stream, thereby impregnating KaneAce M-910 with N-β-(aminoethyl)-γ-aminopropyltrimethoxysilane. To the flask was added 1920 grams of an epoxy-silicone resin copolymer of the following formula.

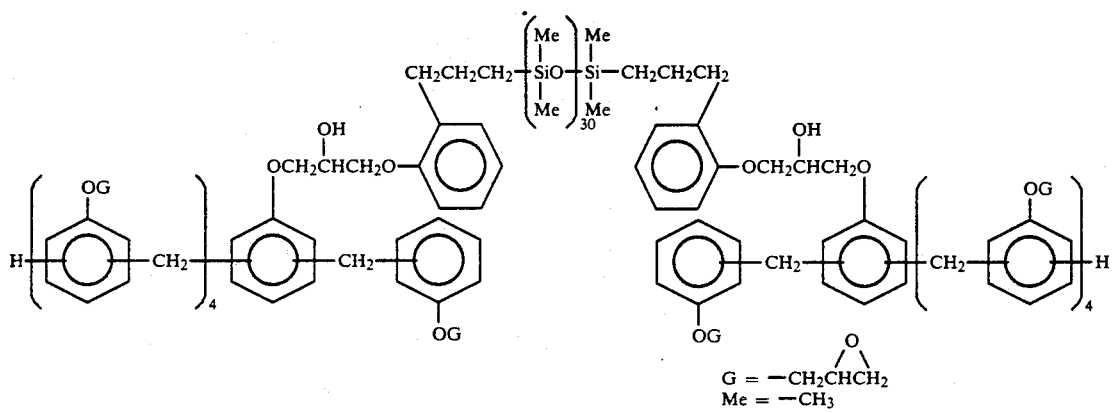

The KaneAce M-901 impregnated with the organic silicon compound was uniformly dispersed in the epoxy-silicone resin copolymer in molten state. Subsequent removal of the toluene in vacuum yielded a resin mix (1) having an epoxy equivalent of 335.

SYNTHESIS 2

The procedure of Synthesis 1 was repeated except that the N-β-(aminoethyl)-γ-aminopropyltrimethoxysilane was replaced by γ-glycidoxypropyltrimethoxysilane (manufactured by Shin-Etsu Chemical Co., Ltd.), yielding a resin mix (2) having an epoxy equivalent of 335.

SYNTHESIS 3

The procedure of Synthesis 1 was repeated except that the N-β-(aminoethyl)-γ-aminopropyltrimethoxysilane was replaced by N-β-(aminoethyl)-γ-aminopropylmethyldimethoxysilane (manufactured by Shin-Etsu Chemical Co., Ltd.), yielding a resin mix (3) having an epoxy equivalent of 335.

SYNTHESIS 4

The procedure of Synthesis 1 was repeated except that the epoxy-silicone resin copolymer was replaced by 900 grams of an epoxy resin (ESX220 manufactured by Sumitomo Chemical K. K.), yielding a resin mix (4) having an epoxy equivalent of 293.

SYNTHESIS 5

The procedure of Synthesis 1 was repeated except that the epoxy-silicone resin copolymer was replaced by 900 grams of a phenolic resin (TD2131 manufactured by Dai-Nippon Ink Chemical K. K.), yielding a resin mix (5) having a hydroxyl equivalent of 147.

SYNTHESIS 6

The procedure of Synthesis 1 was repeated except that the epoxy-silicone resin copolymer was omitted, yielding an organic silicon compound-impregnated thermoplastic resin (6).

SYNTHESIS 7

A 5-liter flask equipped with a reflux condenser, thermometer, and nitrogen inlet tube was charged with 320 grams of KaneAce M-910 (see Synthesis 1) and heated to 170° to 190° C. To the flask was added 3 grams of N-β-(aminoethyl)-γ-aminopropyltrimethoxysilane. Then the contents were mixed in nitrogen stream, thereby impregnating KaneAce M-910 with N-β-(aminoethyl)-γ-aminopropyltrimethoxysilane. To the KaneAce M-910 was added 900 grams of a phenolic resin (TD2131 manufactured by Dai-Nippon Ink Chemical K. K.). The KaneAce M-901 impregnated with the organic silicon compound was uniformly dispersed in the phenolic resin in molten state. There was tapped a resin mix (7) having a hydroxyl equivalent of 147.

SYNTHESIS 8

The procedure of Synthesis 1 was repeated except that the N-β-(aminoethyl)-γ-aminopropyltrimethoxysilane was omitted, yielding a resin mix (8) having an epoxy equivalent of 335 in which KaneAce M-901 free of the organic silicon compound was mixed with the epoxy-silicone resin copolymer. It will be understood that resin mix (8) is a comparative mix.

The resins or resin mixes obtained in Synthesis Examples 1 to 8 are summarized in Table 1.

TABLE 1

| Resin mix | Impregnation of thermoplastic resin with organic silicon compound | Resin with which thermoplastic resin is mixed | Epoxy (OH) equivalent |
|---|---|---|---|
| (1) | Yes | Copolymer* | 335 |
| (2) | Yes | Copolymer | 335 |
| (3) | Yes | Copolymer | 335 |
| (4) | Yes | Epoxy resin | 293 |
| (5) | Yes | Phenolic resin | (147) |
| (6) | Yes | — | — |
| (7) | Yes | Phenolic resin | (147) |
| (8) | No | Copolymer | 335 |

*Copolymer: epoxy-silicone resin copolymer

EXAMPLES 1-11 AND COMPARATIVE EXAMPLES 1-3

Fifteen epoxy resin compositions were prepared by blending the components shown in Table 2 with 10 parts of antimony trioxide, 1.5 parts of γ-glycidoxypropyltrimethoxysilane, 1.0 part of carbon black, and 0.8 parts of triphenylphosphine, and melt milling the mixture in a hot twin roll mill. The epoxy resin compositions were adjusted so as to be identical in epoxy equivalent/hydroxyl equivalent.

For these compositions, the following tests (A) to (E) were carried out. The results are shown in Table 2.

(A) Spiral flow

Using a mold according to the EMMI standard, measurement was made at 175° C. and 70 kg/cm$^2$.

(B) Flexural strength and Flexural modulus

Test bars of 10×100×4 mm which were molded at 175° C. and 70 kg/cm$^3$ for 2 minutes and post cured at 180° C. for 4 hours were tested at 215° C. according to JIS K6911.

(C) Coefficient of linear expansion (μ) and Glass transition temperature (Tg)

Using a dilatometer, test pieces of 4×4×15 mm which were molded at 175° C. and 70 kg/cm$^2$ for 2 minutes and post cured at 180° C. for 4 hours were examined by heating the test pieces at a rate of 5° C./min.

(D) Crack resistance upon soldering after moisture absorption and moisture resistance Semiconductor devices for testing moisture resistance in terms of aluminum wire corrosion were encapsulated with the epoxy resin compositions by molding a 175° C. and 70 kg/cm$^2$ for 2 minutes and post curing at 180° C. for 4 hours (package 60-pin QFP, size 20 mm×14 mm, resin thickness below die pad 0.7 mm, die pad size 10 mm×8 mm). The packages were allowed to stand in a hot humid atmosphere at 85° C. and RH 85% for 72 hours and then immersed for 10 seconds in a solder bath at 260° C. Then the packages were disintegrated to observe the occurrence of internal cracks. Reported is the number of cracked packages/the total number of packages tested.

For each moisture resistance test, there were prepared forth semiconductor devices of the same structure as above (package 14-pin DIP, size 20 mm×14 mm, resin thickness below die pad 0.7 mm, die pad size 10 mm×8 mm). The devices were allowed to stand for 72 hours in a hot humid atmosphere at 85° C. and RH 85%, then dipped for 10 seconds in a solder bath at 260° C., and again allowed to stand in a pressure cooker at 120° C. for 50, 100, 150, 200 and 500 hours before observation of corroded aluminum electrodes. Reported is the number of Al wire broken packages/the total number of packages tested.

(E) Adhesion

Cylinders of 15 mm in diameter and 5 mm high were molded on 42-alloy plates at 175° C. and 70 kg/cm$^2$ for 2 minutes and post cured at 180° C. for 4 hours. Using a push-pull gage, the force required to separate the molded cylinder from the 42-alloy plate was measured.

TABLE 2

| | Examples | | | | | | | | | | | Comparative Examples | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Composition (pbw) | | | | | | | | | | | | | | |
| Epoxy resin *1 | 33 | 33 | 33 | 21 | 33 | 36 | 33 | 37 | 31 | 28 | 59 | 33 | 36 | 38 |
| Phenolic resin *2 | 28 | 28 | 28 | 28 | 16 | 29 | 18 | 29 | 27 | 25 | 31 | 28 | 29 | 30 |
| Brominated epoxy resin *3 | 7 | 7 | 7 | 7 | 7 | 7 | 7 | 7 | 7 | 7 | 7 | 7 | 7 | 7 |
| Resin mix (1) | 30 | | | | | | | | | | | | | |
| Resin mix (2) | | 30 | | | | | | | | | | | | |
| Resin mix (3) | | | 30 | | | | | | | | | | | |
| Resin mix (4) | | | | 16 | | | | | | | | | | |
| Resin mix (5) | | | | | 16 | | | | | | | | | |
| Resin mix (6) | | | | | | 4 | | 2 | 10 | 15 | 4 | | | |
| Resin mix (7) | | | | | | | 16 | | | | | | | |
| Resin mix (8) | | | | | | | | | | | | 30 | | |
| KaneAce M - 901 (non-treated) | | | | | | | | | | | | | 4 | |
| Copolymer *4 | | | | 25 | 25 | 25 | 25 | 25 | 25 | 25 | | | 25 | 25 |
| Fused silica | 400 | 400 | 400 | 400 | 400 | 400 | 400 | 400 | 400 | 400 | 400 | 400 | 400 | 400 |
| Properties | | | | | | | | | | | | | | |
| Spiral flow, cm | 66 | 68 | 67 | 69 | 74 | 64 | 71 | 69 | 62 | 60 | 65 | 67 | 64 | 70 |
| Flexural strength, kg/mm$^2$ | 12.3 | 11.6 | 12.0 | 12.6 | 11.9 | 11.7 | 12.0 | 12.2 | 11.8 | 11.5 | 11.8 | 11.9 | 11.7 | 12.3 |
| Flexural modulus, kg/mm$^2$ | 1240 | 1270 | 1250 | 1210 | 1250 | 1280 | 1240 | 1220 | 1300 | 1290 | 1380 | 1320 | 1300 | 1240 |
| Tg, °C. | 173 | 170 | 171 | 172 | 177 | 169 | 175 | 170 | 170 | 170 | 170 | 168 | 167 | 171 |
| μ (× 10$^{-5}$) | 1.4 | 1.4 | 1.4 | 1.4 | 1.3 | 1.4 | 1.3 | 1.4 | 1.4 | 1.4 | 1.5 | 1.4 | 1.5 | 1.5 |
| Crack resistance upon soldering | 0/20 | 0/20 | 0/20 | 0/20 | 0/20 | 0/20 | 0/20 | 0/20 | 0/20 | 0/20 | 0/20 | 5/20 | 7/20 | 15/20 |
| Moisture resistance | | | | | | | | | | | | | | |
| 50 hr. | 0/40 | 0/40 | 0/40 | 0/40 | 0/40 | 0/40 | 0/40 | 0/40 | 0/40 | 0/40 | 0/40 | 0/40 | 0/40 | 7/40 |
| 100 hr. | 0/40 | 0/40 | 0/40 | 0/40 | 0/40 | 0/40 | 0/40 | 0/40 | 0/40 | 0/40 | 0/40 | 0/40 | 5/40 | 18/40 |
| 150 hr. | 0/40 | 0/40 | 0/40 | 0/40 | 0/40 | 0/40 | 0/40 | 0/40 | 0/40 | 0/40 | 0/40 | 2/40 | 21/40 | 31/40 |
| 200 hr. | 0/40 | 0/40 | 0/40 | 0/40 | 0/40 | 0/40 | 0/40 | 1/40 | 1/40 | 0/40 | 0/40 | 5/40 | 27/40 | 36/40 |
| 500 hr. | 0/40 | 2/40 | 0/40 | 0/40 | 0/40 | 1/40 | 0/40 | 3/40 | 1/40 | 0/40 | 2/40 | 11/40 | 32/40 | 40/40 |
| Adhesion, kg | 35 | 29 | 32 | 31 | 35 | 27 | 33 | 23 | 25 | 24 | 20 | 15 | 10 | 6 |

*1 epoxidized o-cresol novolak resin, epoxy equivalent 200, softening point 65° C.
*2 phenol novolak resin, phenolic hydroxyl equivalent 110, softening point 80° C.
*3 epoxidized novolak resin, epoxy equivalent 280
*4 epoxy-silicone resin copolymer, epoxy equivalent 290

As seen from the data of Table 2, the epoxy resin compositions having blended therein the organic silicon compound-impregnated thermoplastic resin (Examples 1-10) provide cured products which are improves in adhesion and crack resistance upon soldering after moisture absorption over the compositions having blended therein the organic silicon compound-free thermoplastic resin (Comparative Examples 1-2) and the composition in which the thermoplastic resin is absent (Comparative Example 3). It will be understood that in Comparative Examples 1to 2, the thermoplastic resin is not impregnated, but mixed with the organic silicon compound (γ-glycidoxypropyltrimethoxysilane) as is evident from their formulation. The results of Comparative Examples 1 to 2 suggest that a mere mixture of a thermoplastic resin and an organic silicon compound is not effective for the objects of the present invention.

Although some preferred embodiments have been described, many modifications and variations may be made thereto in the light of the above teachings. It is therefore to be understood that within the scope of the appended claims, the invention may be practiced otherwise than as specifically described.

We claim:

1. An epoxy resin composition comprising an epoxy resin, a curing agent therefor, and a thermoplastic resin impregnated with an organic silicon compound which is obtained by swelling said thermoplastic resin with a solvent and impregnating said swollen thermoplastic resin with said organic silicon compound.

2. The epoxy resin composition of claim 1 wherein the thermoplastic resin is selected from the group consisting of styrene-butadiene-methyl methacrylate copolymers, styrene-ethylene-butene-styrene copolymers, polybutadiene rubber, polyisoprene rubber, styrene-butadiene-vinyl pyridine copolymers, acrylonitrile-butadiene-styrene copolymers, acrylonitrile-styrene copolymers, styrene-isoprene copolymers, vinylidene fluoride resin, carboxy-modified butadiene-acrylonitrile copolymers, thermoplastic resin nylon, polybutylene terephthalate resin, polybutene-1, polyvinyl hexylal resin, polyvinyl propional resin, polyvinyl acetoacetal resin, polyvinyl butyral resin, polyvinyl formal resin, polyvinyl ether resin, polyester elastomers, and polyurethane-methyl methacrylate copolymers, and the organic silicon compound is of formula (1):

$$R^1R^2{}_aSi(OR^3)_{3-a} \qquad (1)$$

wherein $R^1$ is an organic group with 1 to 10 carbon atoms having a functional group selected from the group consisting of an alkenyl, acryl, methacryl, amino, ethylenediamino, amido, and ureido group, $R^2$ is a hydrogen atom or a substituted or unsubstituted monovalent hydrocarbon group having 1 to 5 carbon atoms, $R^3$ is a substituted or unsubstituted monovalent hydrocarbon group having 1 to 5 carbon atoms or an alkoxy group, and letter a is $0 \leq a \leq 2$.

3. The epoxy resin composition of claim 1 wherein the thermoplastic resin impregnated with an organic silicon compound is blended in an amount of about 1 to about 15 parts by weight per 100 parts by weight of the epoxy resin plus curing agent, and the organic silicon compound is used in an amount of about 0.5 to about 10 parts by weight per 100 parts by weight of the thermoplastic resin.

4. The epoxy resin composition of claim 1 which further comprises an epoxy-silicone resin copolymer.

5. The epoxy resin composition of claim 4 wherein the epoxy-silicone resin copolymer is a reaction product obtained by addition reaction between an alkenyl group-containing epoxy resin and an organopolysiloxane of formula (2):

$$H_aR_bSiO_{(4-a-b)/2} \qquad (2)$$

wherein R is a substituted or unsubstituted monovalent hydrocarbon group, a is a number of from 0.01 to 0.1, b is a number of from 1.8 to 2.2, and $1.8 < a+b < 2.3$, the number of silicon atoms per molecule is an integer of from 20 to 500, and the number of hydrogen atoms directly attached to silicon atoms is an integer of from 1 to 5.

6. The epoxy resin composition of claim 5 wherein the epoxy-silicone resin copolymer is blended in an amount of up to about 50 parts by weight per 100 parts by weight of the epoxy resin plus curing agent.

7. A cured product obtained by curing an epoxy resin composition as set forth in any one of claims 1 to 3 or 5 to 6.

8. The epoxy resin composition of claim 2, wherein said organic silicon compound is selected from the group consisting of:

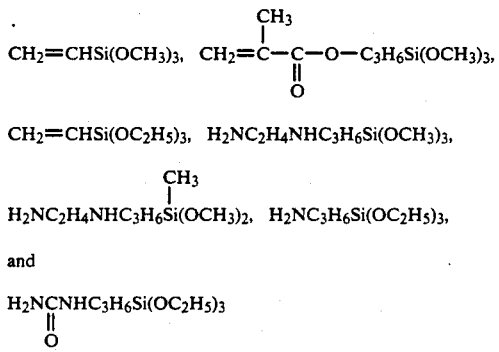

9. The epoxy resin composition of claim 1, wherein said solvent used to swell said thermoplastic resin is selected from the group consisting of toluene, xylene, benzene, hexane, cyclohexane, tetrahydrofuran, methyl isobutyl ketone, acetone, cyclohexanone, methanol, ethanol and butanol.

10. The epoxy resin composition of claim 2, wherein said solvent used to swell said thermoplastic resin is selected from the group consisting of toluene, xylene, benzene, hexane, cyclohexane, tetrahydrofuran, methyl isobutyl ketone, acetone, cyclohexanone, methanol, ethanol and butanol.

11. The epoxy resin composition of claim 1 or 2, wherein said epoxy resin is selected from the group consisting of:

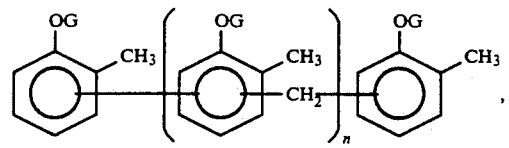

-continued
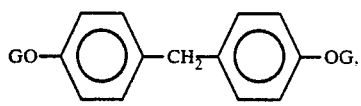
and
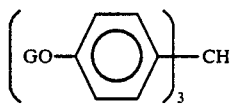
-continued
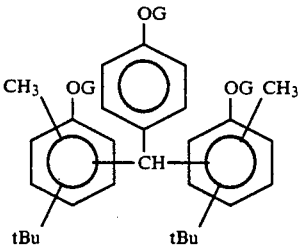
wherein
G is
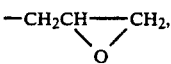
tBu is —C(CH$_3$)$_3$,
and n is an integer of from 0 to 30.
* * * * *